United States Patent
Persson

(10) Patent No.: US 6,557,657 B2
(45) Date of Patent: May 6, 2003

(54) ADD-ON DISC ASSEMBLY FOR BICYCLE HUB

(75) Inventor: Stephen R. Persson, 853 Meadow La., Sycamore, IL (US) 60178

(73) Assignee: Stephen R. Persson, Sycamore, IL (US)

(*) Notice: Subject to any disclaimer, the term of this patent is extended or adjusted under 35 U.S.C. 154(b) by 0 days.

(21) Appl. No.: 10/039,604

(22) Filed: Jan. 3, 2002

(65) Prior Publication Data

US 2002/0084134 A1 Jul. 4, 2002

Related U.S. Application Data

(60) Provisional application No. 60/259,385, filed on Jan. 3, 2001.

(51) Int. Cl.[7] .................................................. B60K 1/00
(52) U.S. Cl. ........................................ 180/220; 180/65.2
(58) Field of Search .............................. 180/220, 221, 180/224, 65.1, 65.5, 65.2, 219, 218

(56) References Cited

U.S. PATENT DOCUMENTS

| 4,666,173 | A | * | 5/1987 | Graham | 280/255 |
| 6,011,366 | A | * | 1/2000 | Murakami et al. | 318/1 |
| 6,024,186 | A | * | 2/2000 | Suga | 180/291 |
| 6,173,801 | B1 | * | 1/2001 | Kakutani et al. | 180/220 |
| 6,305,485 | B1 | * | 10/2001 | Kwan | 180/221 |
| 6,347,682 | B1 | * | 2/2002 | Buchner | 180/220 |
| RE37,583 | E | * | 3/2002 | Mayer et al. | 180/220 |

* cited by examiner

Primary Examiner—Lesley D. Morris
Assistant Examiner—Tony Winner
(74) Attorney, Agent, or Firm—Cook, Alex, McFarron, Manzo, Cummings & Mehler, Ltd.

(57) ABSTRACT

An apparatus and method for mounting a disc assembly to a bicycle wheel's hub. The disc assembly is clamped to the hub using a backing member in the form of a split washer assembly. Bolts connect the disc assembly to three split washer segments. The disc assembly can be either a motor drive sprocket or a disc brake rotor.

12 Claims, 3 Drawing Sheets

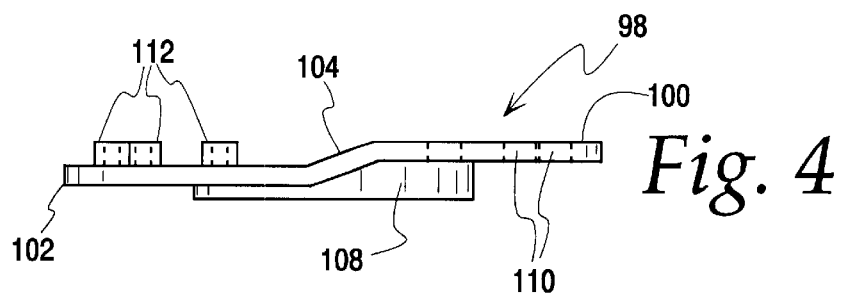
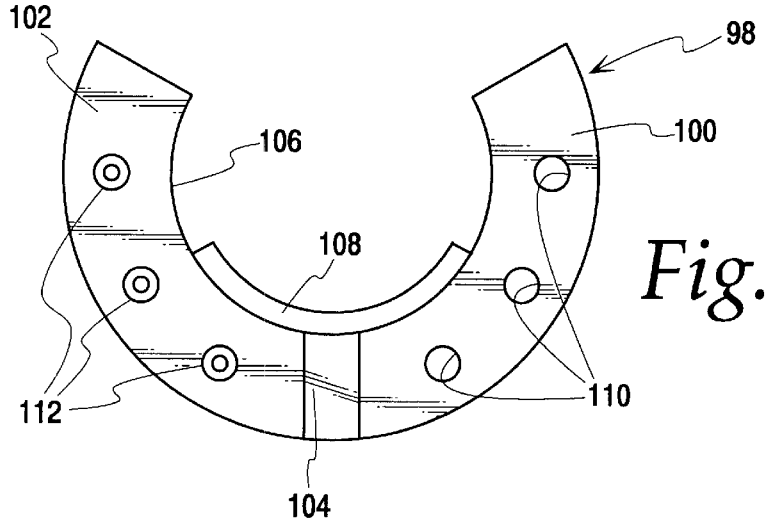
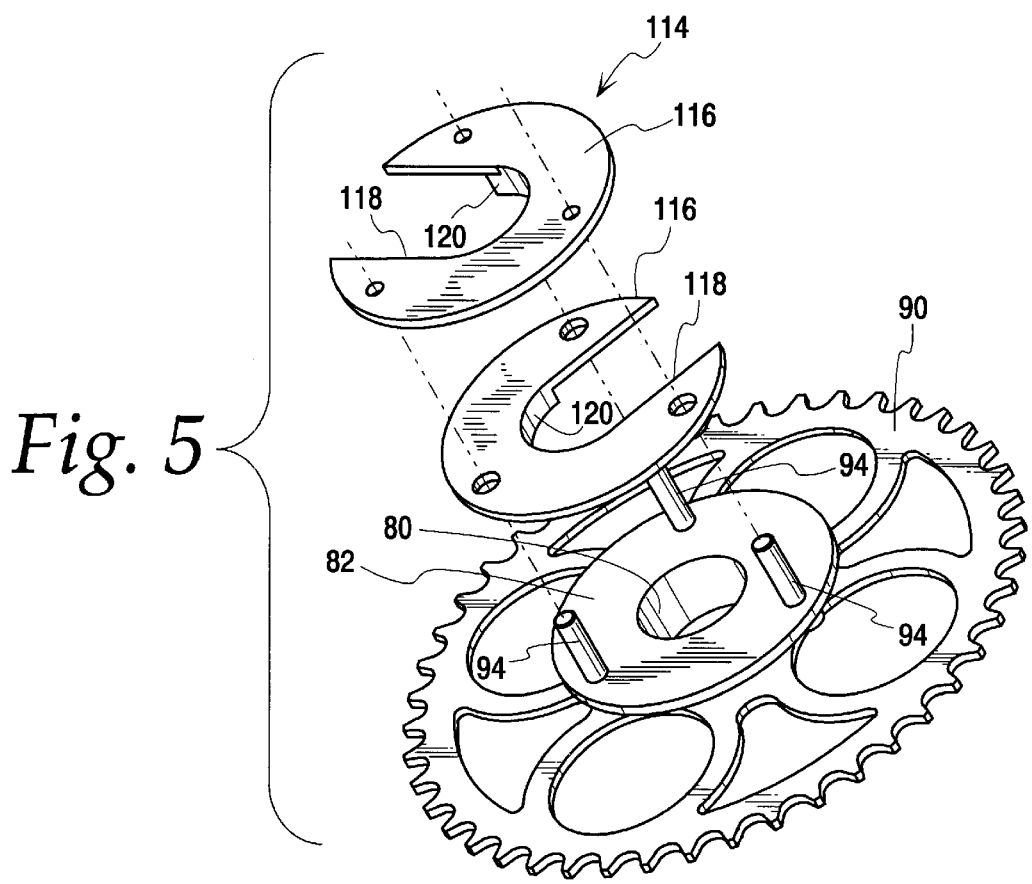

ADD-ON DISC ASSEMBLY FOR BICYCLE HUB

This Appln claims benefit of Prov. No. 60/259,385 filed Jan. 3, 2001.

BACKGROUND OF THE INVENTION

The present invention relates generally to the use of split washers to attach a device to a traditional bicycle with minimum experience or tools. More specifically, the invention relates to the conversion of a standard bicycle by consumers into a motorized bicycle. Bicycles are valuable vehicles in society today, whether used for pleasure, exercise or transportation. The use of bicycles as transport cuts emission pollution and is less costly than other means. Bicycles are used by young and old alike because of their relatively low cost and their benefits as transportation and as a form of exercise. However, despite widespread use of bicycles they may be used minimally, or may be altogether avoided, because of the physical effort required in bicycle riding. Particularly when traveling long distances, it may be difficult to sustain the exertion necessary to propel a bicycle. Yet, when used as a form of exercise, such physical exertion is desirable. It would be advantageous to have a bicycle that may be used with or without assistance of an auxiliary motor.

Various past endeavors have sought ways to add a motorized assist to a bicycle in order to reduce the physical exertion required of a rider. Techniques such as mounting a motor to the frame have been employed. In recent years, devices have allowed the bicycle to both be pedaled by a rider and propelled by a motor at the same time. The use of motors on bicycles has proven effective to allow a rider to either use his own physical effort to propel the bicycle or to gain assistance through the motor. Motorized bicycles have a motor which is connected by a roller chain to a sprocket at the bicycle's rear wheel to propel the bicycle. The motor and chain turn the sprocket, which then turns the wheel. The rider of the bicycle need not exert any force to propel the bicycle.

Past problems with motorized bicycles include a cumbersome motor and the necessity for significant alterations to the standard bicycle. Often the sprocket set that came with the bicycle must be permanently replaced by a specialized sprocket set. This type of installation requires a fair amount of expertise that is generally beyond the casual cyclist. They must hire a trained professional to install the specialized sprocket set. The drawback addressed by the present invention is the past necessity that a bicycle be either purchased with the motor sprocket and motor attached, or that the motor sprocket be attached by a professional. As a result of this existing drawback, added expense and effort on the part of the consumer are necessary in order to convert a standard bicycle to a power-assisted bicycle. The present invention recognizes the disadvantages of these difficulties in attaching a disc assembly, such as a sprocket or disc brake, to the hub of a bicycle.

SUMMARY OF THE INVENTION

The present invention provides a device and method for attaching a disc assembly to a traditional bicycle by using split washers. The split washers may be disassembled into individual pieces in order to fit through the spokes of the wheel and then reassembled on the hub in the inner space of the wheel. Once assembled, the split washer assembly may be connected to a disc assembly by bolts. The bolts fit through the spaces between spokes of the wheel and connect to the flange of the disc assembly. The disc assembly may contain a sprocket, such as in a motorized bicycle, or may contain another disc such as a disc brake.

In the preferred embodiment of the invention, the split washer assembly consists of three separate segments. Each split washer segments couples with another segment, forming a ring when connected. The ring, or assembly, of split washer segments has a hole in its center for receiving the hub of a bicycle. Preferably, the split washer assembly is removably connected to the rear hub axle of the bicycle. The split washers are easily separated for removal from the axle.

The ease of assembly of the split washers allows any disc assembly, preferably a disc brake or sprocket assembly, to be mounted to the bicycle without the need for professional help and with minimal expense. This invention provides not only the device for mounting a disc assembly, but also the method for such a mounting operation.

BRIEF DESCRIPTION OF THE DRAWINGS

FIG. 3 is a plan view of a backing member segment.

FIG. 4 is a side elevation view of a backing member segment.

FIG. 5 is an exploded perspective view showing the central collar and flange and an alternate embodiment of the backing member.

DETAILED DESCRIPTION OF THE INVENTION

Figure 1:
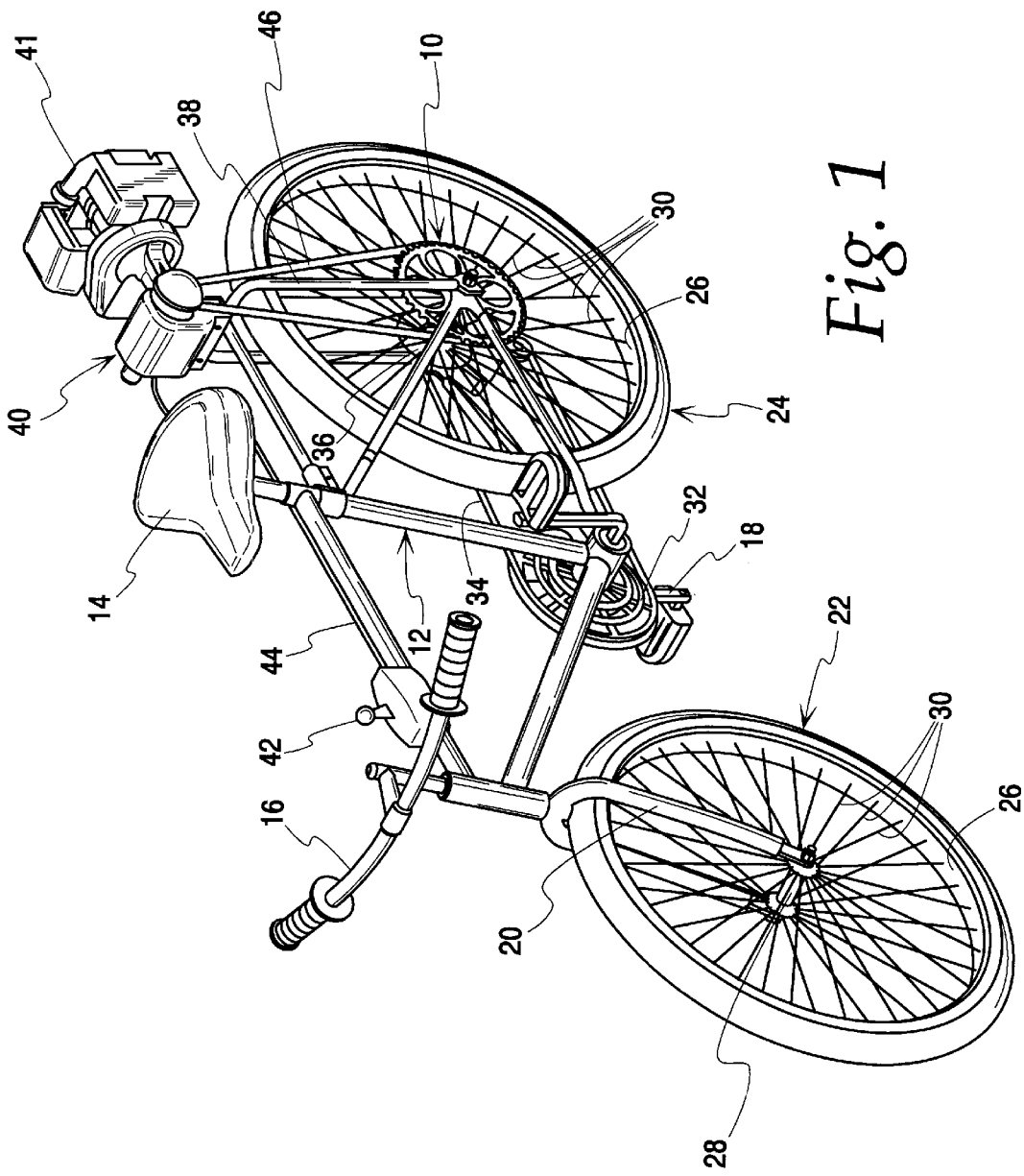
FIG. 1 is a perspective view of a bicycle outfitted with a motor assist and the add-on disc assembly of the present invention.

FIG. 1 illustrates a bicycle having the add-on disc assembly 10 of the present invention installed thereon, together with an auxiliary motor unit. Apart from the add-on disc assembly and motor, the bicycle may be conventional. It includes a frame 12 which carries a seat 14, handlebars 16, pedals 18 and a front wheel fork 20. Front and rear wheels 22 and 24 each include a rim 26, an axle and hub assembly 28, and spokes 30 connecting the rim and hub. A pedal sprocket 32 drives a chain 34 which in turn engages a set of rear sprockets 36 in the conventional manner. A U-shaped motor support 38 is connected to the frame 12 at the rear wheel axle. The auxiliary motor unit 40 is attached to the support 38. The motor may be driven by either a small internal combustion engine as at 41 or by a battery. A motor control lever 42 is attached to the horizontal bar of the frame. A control cable 44 runs from the lever 42 to the motor 40. An auxiliary chain 46 connects the motor 40 to the add-on disc assembly 10.

Figure 2:
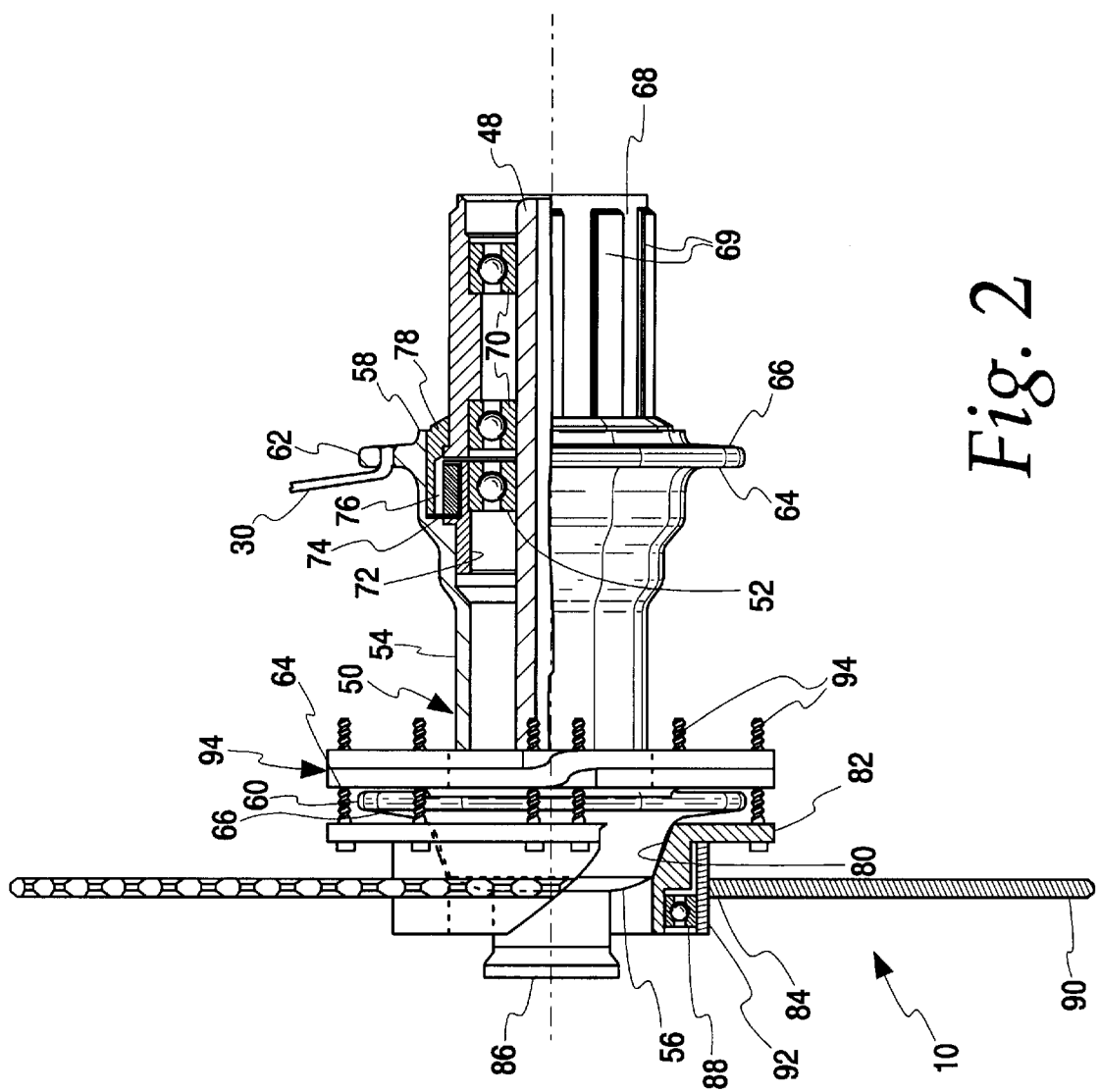
FIG. 2 is a partial axial section through a bicycle hub including the add-on disc assembly of the present invention.

Details of the rear wheel's axle and hub assembly are shown in FIG. 2. The rear wheel 24 includes an axle 48 which is adapted for mounting to the bicycle frame 12. A hub 50 is rotatably mounted on the axle by bearings, one of which is visible at 52. The hub includes a cylindrical sleeve 54 of a first diameter and first and second end portions 56 and 58. Near the end portions are first and second spoke anchoring rings 60 and 62. The spoke anchoring rings receive the inner ends of the spokes 30 and have a second outer diameter which is greater than that of the sleeve 54. The anchoring rings have inner and outer radial surfaces 64 and 66. The right end of the axle, as seen in FIG. 1, mounts a sprocket carrier 68 which includes splines 69 for receiving the set of rear sprockets 36. These sprockets are driven by the chain 34 connected to the pedal sprockets 32 on the pedal crank. The sprocket carrier 68 rotates on bearings 70. A one-way clutch connects the sprocket carrier to the hub sleeve. The one-way clutch includes a pawl carrier 72, a pawl 74, pawl teeth 76 and a drive sleeve 78. The pawl carrier 72 is firmly connected to the hub sleeve 54. The drive sleeve 78 engages the splines 69 of the sprocket carrier 68. The one-way clutch is conventional. It allows free wheeling rotation between the sprocket carrier and hub in one direction while connecting the carrier 68 and hub 54 in driving relation when rotated in the opposite direction.

A preferred embodiment of the add-on disc assembly 10 is shown in FIG. 2. The disc assembly includes an outer disc in the form of a central collar 80 to which a flange 82 is affixed as by welding. The collar 80 is adapted for engagement with an outer clamping surface, in this case the end portion 56 of the hub sleeve 54. The collar 80 has a conical surface at 84 for engaging the end portion 56. The flange 82 is fixed to an inner edge of the central collar 80. The flange has an outer diameter greater than that of the spoke anchoring rings 60 and 62. A one-way clutch is shown schematically at 86. It is fastened to the collar and includes a bearing 88. A motor sprocket 90 is fixed to a sleeve 92 that fits over the one-way clutch and bearing 88. The bearing permits relative rotation between the collar 80 and motor sprocket 90. The motor sprocket is driven by the motor 40 through the auxiliary chain 46.

A plurality of arms in the form of bolts 94 extend through holes in the flange 82 at a location outside the outer diameter of the spoke anchoring ring 60. The bolts extend over the ring 60 to a point where they engage a backing member 96. The backing member 96 comprises three identical segments 98. Details of one of the segments are shown in FIGS. 3 and 4. The segments 98 have a C-shaped body having an upper leg 100 and a lower leg 102 joined by an angled transition portion 104. Each leg extends for an arc of about 120°. Together the legs and transition portion define an opening 106. The central portion of the body has a depending arcuate tab 108 extending approximately 120°. As can be seen in FIG. 3 the tab spans the transition portion 104 and extends about an equal amount on each side of the transition portion. Thus, the axial extent of the tab 108 is somewhat greater under the upper leg than it is under the lower leg. The upper leg 100 has three receptacles 110 formed therein. The lower leg 102 has three similarly spaced pegs 112 attached to its upper surface. The pegs have a threaded bore therethrough. The outside diameter of the pegs 112 is chosen to fit closely inside the receptacles 110 of a mating segment 98.

Installation of the add-on disc assembly on a bicycle is as follows. The individual segments 98 of the backing member 96 are threaded between the spokes 30 to a point intermediate the two spoke anchoring rings 60 and 62. The openings 106 are arranged to receive the hub sleeve 54. The adjacent upper and lower legs 100 and 102 of two adjacent segments 98 will overlap each other as best seen in FIG. 2. The pegs 112 of one segment fit into the receptacles 110 of an adjacent segment. The tabs 108 assist in aligning the segments. Next the collar 80 is placed over the end portion of the hub with the conical surface 84 engaging the hub end portion 56. This places the flange 82 adjacent the outer radial surface 66 of the spoke anchoring ring 60. Bolts 94 are passed through openings in the flange and into the threaded bores in the backing member pegs 112. Tightening the bolts clamps the collar 80 to the outer clamping surface and the backing member 96 to the inner clamping surface.

It can be seen that the add-on disc assembly of the present invention provides a structure which is simple to install on an existing bicycle hub with no alteration of the existing hub or its pedal drive sprockets. An additional sprocket is provided for connection to the auxiliary motor. This affords the rider the option of pedal power, motor power or a combination of both. The straightforward attachment method of the add-on disc assembly can be performed by bicycle users without the need for special skills or tools.

While the add-on disc assembly has been described thus far in connection with adding a sprocket to be driven by an auxiliary motor, the invention also encompasses adding a rotor for a disc brake assembly. The rotor would be attached in the same manner as described above with the exceptions that an outer disc in the form of a brake rotor would be substituted for the motor sprocket and the one-way clutch and bearing unit would not be present. The brake assembly would include calipers for engaging the rotor when the rider activates the brakes.

An alternate embodiment of the backing member is shown in FIG. 5. The alternate backing member 114 has two C-shaped segments 116, each having an opening 118 and a depending tab 120. This is similar in nature to the backing member 96 except it has two segments instead of three. The three-segment backing member is preferred because all three segments have the same shape. This reduces the number of separately designed parts required.

While a preferred form of the invention has been shown and described, it will be realized that alterations and modifications may be made thereto without departing from the scope of the following claims. For example, the arms need not necessarily be in the form of bolts. Other types of adjustable fasteners that reach over the spoke anchoring rings and connect the flange and backing member could be used. An overcenter latch is an example. Also, the backing member need not necessarily be in the form of the split washer shown. The backing member could take various forms so long as it is possible to thread the backing member between the spokes and into the area between the spoke anchoring rings.

I claim:

1. In a bicycle wheel having a rim, an axle which is suitable for attachment to a bicycle frame, a hub mounted for rotation on the axle, the hub having a first diameter, the hub including first and second end portions and first and second spoke anchoring rings connected to the hub near its ends at axially spaced locations, the anchoring rings each having inner and outer radial surfaces and a second diameter greater than the first diameter of the hub, a plurality of spokes attached to the spoke anchoring rings and to the rim, the improvement comprising an add-on disc assembly, including:

an outer disc adapted for engagement with an outer clamping surface, the outer clamping surface comprising at least one of one end portion of the hub and an outer radial surface of the spoke anchoring ring nearest said one end portion of the hub;

a backing member engageable with an inner clamping surface, the inner clamping surface comprising at least one of the inside radial surface of the spoke anchoring ring nearest said one end portion of the hub, the other of the end portions of the hub, and the spoke anchoring ring farthest from said one end portion of the hub; and at least two arms connected to the outer disc, the arms extending over the spoke anchoring ring nearest said one end portion of the hub and engaging the backing member, the arms being adjustably connected to at least one of the outer disc and backing member to permit the separation between the outer disc and backing member to be adjustably fixed and thereby clamp the outer disc and backing member to the inner and outer clamping surfaces respectively.

2. The add-on disc assembly of claim 1 wherein the outer disc comprises:

a central collar adapted for engagement with the outer clamping surface;

a flange fixed to the central collar, the flange having an outer diameter greater than that of the spoke anchoring ring, the arms being connected to the flange at a location outside the outer diameter of the spoke anchoring ring nearest said one end portion of the hub; and a motor sprocket attached to the central collar.

3. The add-on disc assembly of claim 2 further comprising a one-way clutch and bearing unit attached to the central collar with the sprocket connected to said unit.

4. The add-on disc assembly of claim 1 wherein the backing member comprises at least two segments adapted to be received between the spoke anchoring rings for engagement with the inner clamping surface.

5. The add-on disc assembly of claim 4 wherein each segment comprises a generally C-shaped body partially surrounding the hub and having a slot formed therein.

6. The add-on disc assembly of claim 5 wherein each segment includes a tab which extends into the slot of the other segment the body when the segments are assembled in place on the hub.

7. The add-on disc assembly of claim 1 wherein the backing member comprises at least three identical segments adapted to be received between the spoke anchoring rings for engagement with the inner clamping surface.

8. The add-on disc assembly of claim 7 wherein each segment comprises a generally C-shaped body partially surrounding the hub and having a slot formed therein.

9. The add-on disc assembly of claim 8 wherein each segment includes a tab which extends into the slot of the other segment the body when the segments are assembled in place on the hub.

10. The add-on assembly of claim 9 wherein each segment has first and second generally planar sections offset from one another by a distance approximately equal to the thickness of the segment material.

11. In a bicycle including a frame, a wheel having a rim, an axle which is suitable for attachment to the frame, a hub mounted for rotation on the axle, the hub including first and second end portions and first and second spoke anchoring rings connected to the hub near its ends at axially spaced locations, and a plurality of spokes attached to the spoke anchoring rings and to the rim, a method of adding a motor to the bicycle, comprising the steps of:

mounting a motor on the frame;

attaching a collar having a flange to a one-way clutch and bearing assembly;

mounting a motor sprocket for rotation on the one-way clutch;

placing a backing member between the spoke anchoring rings on the hub;

placing the collar in contact with an end portion of the hub; and connecting arms between the flange and the backing member and tightening the arms to clamp the flange and backing member on the hub.

12. A bicycle, comprising:

a frame;

a motor mounted on the frame;

front and rear wheels each having a rim, an axle which is suitable for attachment to the frame, a hub mounted for rotation on the axle, the hub having a first diameter, and including first and second end portions and first and second spoke anchoring rings connected to the hub near its ends at axially spaced locations, the anchoring rings each having inner and outer radial surfaces and a second diameter greater than the first diameter of the hub, a plurality of spokes attached to the spoke anchoring rings and to the rim;

a motor sprocket adapted for engagement with an outer clamping surface, the outer clamping surface comprising at least one of one end portion of the hub and an outer radial surface of the spoke anchoring ring nearest said one end portion of the hub;

a backing member engageable with an inner clamping surface, the inner clamping surface comprising at least one of the inside radial surface of the spoke anchoring ring nearest said one end portion of the hub, the other of the end portions of the hub, and the spoke anchoring ring farthest from said one end portion of the hub;

at least two arms connected to the motor sprocket, the arms extending over the spoke anchoring ring nearest said one end portion of the hub and engaging the backing member, the arms being adjustably connected to at least one of the motor sprocket and backing member to permit the separation between the motor sprocket and backing member to be adjustably fixed and thereby clamp the motor sprocket and backing member to the inner and outer clamping surfaces respectively; and a drive chain connecting the motor to the motor sprocket.

* * * * *